United States Patent [19]

Carter et al.

[11] 4,252,103
[45] Feb. 24, 1981

[54] FRAME STRUCTURE FOR A SOLAR HEATING PANEL

[75] Inventors: Melvin K. Carter, Los Gatos; Fredrick Nadel, San Jose, both of Calif.

[73] Assignee: Advanced Energy Technology, Los Gatos, Calif.

[21] Appl. No.: 925,455

[22] Filed: Jul. 17, 1978

[51] Int. Cl.³ .............................................. F24J 3/02
[52] U.S. Cl. .................................... 126/450; 126/446
[58] Field of Search ................ 126/450, 448, 447, 446

[56] References Cited

U.S. PATENT DOCUMENTS

| | | | |
|---|---|---|---|
| 3,974,822 | 8/1976 | Patil | 126/450 |
| 4,098,259 | 7/1978 | Barber | 126/450 |
| 4,120,287 | 10/1978 | Marles et al. | 126/447 |

*Primary Examiner*—Carroll B. Dority, Jr.
*Attorney, Agent, or Firm*—Harry E. Aine; Harvey G. Lowhurst

[57] ABSTRACT

In a solar heating panel, the panel includes a plate-like solar collector having a serpentine shaped fluid conduit soldered to the plate collector in heat exchange relation therewith. Laterally directed manifolds are provided at opposite ends of the collector and are coupled in fluid communication with the serpentine flow path for coupling a plurality of such solar heating panels in parallel across a manifold structure. The panels include frame structures having a pair of elongated side frame members closed at opposite ends by means of end members with the side and end members having slots formed therein in registration one with the other such that when the side members are mated to the end members, the slots are in registration to define the side ports in the frame for passage therethrough of said manifold conduits. Thermally insulative collars surround the manifold pipes and include annular recesses for receiving the marginal edges of the slots, thereby forming an interlocked framed solar collector structure.

7 Claims, 2 Drawing Figures

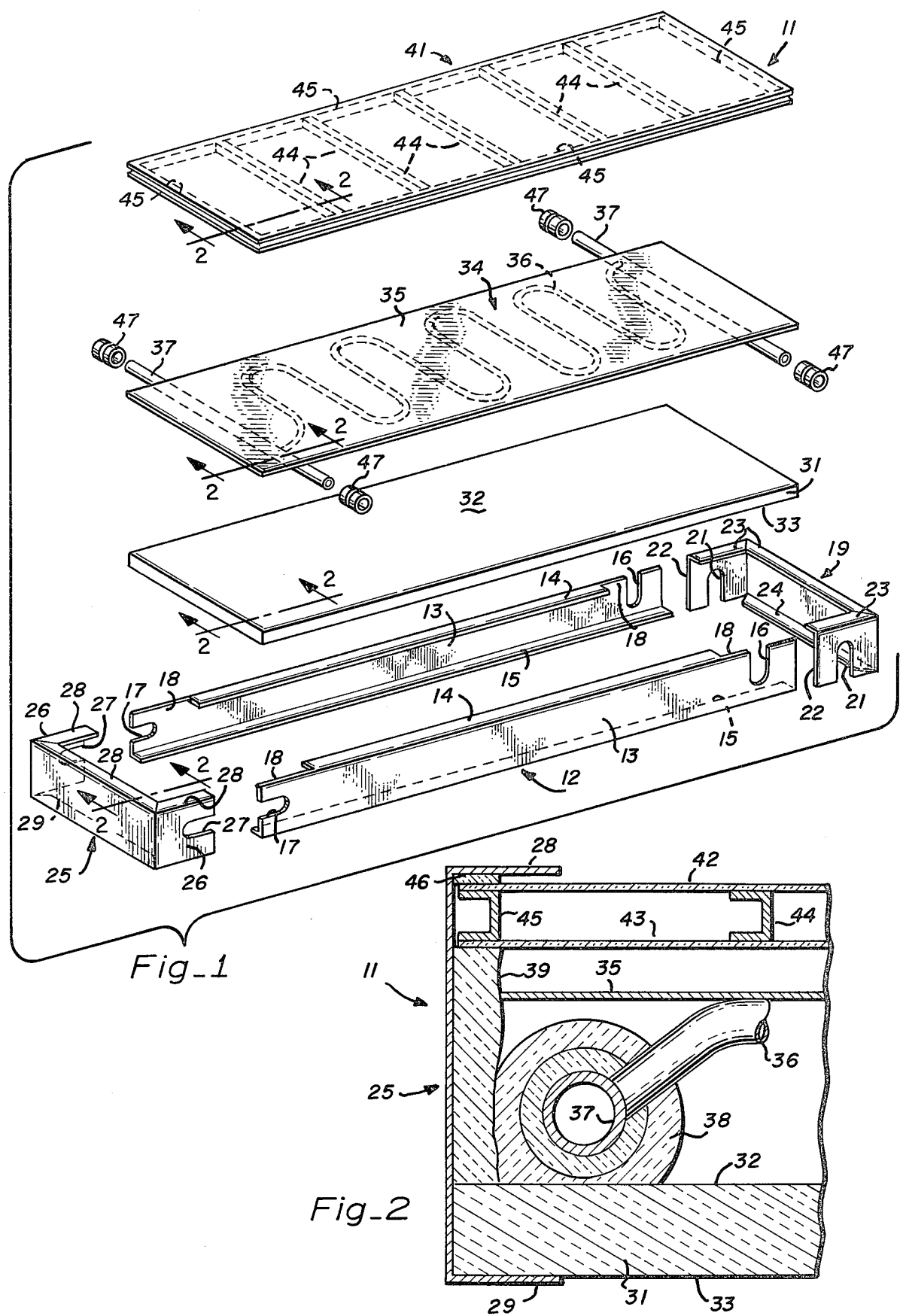

FRAME STRUCTURE FOR A SOLAR HEATING PANEL

BACKGROUND OF THE INVENTION

The present invention relates in general to solar heating panels and, more particularly, to an improved solar heating panel of the type including a frame structure with laterally directed manifolding.

DESCRIPTION OF THE PRIOR ART

Heretofore, it has been proposed to provide a rectangular solar heating panel with laterally directed manifolds at opposite ends. The manifolding ports were provided by forming a rectangular glazing cap structure with vertically directed recesses at opposite ends of the vertical side walls of the glazing cap to accommodate the laterally directed manifolds employed for directing the heat exchanging fluid through the various solar collector panels in essentially parallel fluid flow relation. The glazing cap was secured to a base panel member, as by adhesive, and was captured to the base panel by means of channel members covering the mating flanged portion of the glazing cap and base. Such a solar heating panel structure is disclosed in U.S. Pat. No. 4,055,163, issued Oct. 25, 1977.

It is also known form the prior art to utilize an extruded U-shaped metallic channel frame member, as of aluminum, for framing the solar heating panel structure including the glazing and solar collector member. However, in this structure the manifold ports were provided in the opposite end portions of the solar heating panel. Such a solar heating panel is disclosed in U.S. Pat. No. 4,011,856 issued Mar. 15, 1977.

While the aforecited solar heating panels are suitable for their intended use, the preformed glazing cap structure is relatively costly of manufacture and the aforecited extruded aluminum frame is relatively difficult of fabrication.

Accordingly, it is desirable to provide a relatively inexpensive framing structure which facilitates stuffing of the frame with the various components including the glazing, solar collector panel, and various insulative members, such that the resultant panel will be efficient, strong, light weight, and more easily fabricated.

SUMMARY OF THE PRESENT INVENTION

The principal object of the present invention is the provision of an improved framing structure for solar heating panels.

In one feature of the present invention, the framing for a solar heating panel includes a pair of elongated side frame members and a pair of mating end members, said side and end members having slots formed therein in registration one with the other such that when said end members are mated with said side members said slots are in registration to define side ports for passage of the manifolding therethrough.

In another feature of the present invention, the laterally directed manifolding members include thermally insulative collars disposed thereon, each of said collars having an annular recess for receiving the marginal edges of the slots in the mated side and end portions of the frame structure, whereby an interlocked composite frame structure is formed which holds the manifolding pipes in thermally insulative relation relative to the framing structure.

Other features and advantages of the present invention will become apparent upon a perusal of the following specification taken in connection with the accompanying drawings wherein:

BRIEF DESCRIPTION OF THE DRAWINGS

FIG. 1 is a vertically exploded perspective view of a solar heating panel incorporating features of the present invention, and FIG. 2 is an enlarged cross-sectional view of a portion of the structure of FIG. 1 taken along line 2—2 in the direction of the arrows.

DESCRIPTION OF THE PREFERRED EMBODIMENTS

Referring now to FIGS. 1 and 2 there is shown a solar heating panel 11 incorporating features of the present invention. The solar heating panel 11 includes a rectangular metallic frame structure 12, as of 0.032 inch to 0.025 inch thick aluminum sheet of alloy 5052 H34. The frame 12 includes a pair of elongated side frame members 13. Each frame member 13 is bent into a generally U-shaped channel member having a base height of approximately 4 inches with inwardly directed upper and lower flange portions 14 and 15, respectively, as of approximately $\frac{3}{4}$ of an inch wide. Each side member 13 includes a pair of vertically directed slots 16 disposed substantially at one end of the channel members. In a typical example, the slot 16 is $1\frac{1}{8}$ inches wide and 2 5/16 inches deep. The other end of each of the side members 13 is provided with a horizontally directed slot 17, as of $1\frac{1}{8}$ inches wide and $2\frac{3}{8}$ inches deep. The upper inwardly directed flange portion 14 is cut back from each end of the side members 13 for a distance of approximately 4 inches at 18.

The frame structure 12 is closed at one end by means of a generally U-shaped end piece 19 made of essentially the same material and width dimensions as the side members 13 and including a pair of vertically directed slots 21 as of $1\frac{1}{8}$ inches wide and 2 13/16 inches deep centered approximately $1\frac{7}{8}$ inches from the turned-in ends 22 of the U-shaped end closing member 19. The upper edge of the end member 19 includes an inwardly directed flange portion 23 as of $\frac{3}{4}$ of an inch wide and an inwardly directed lowered flange portion 24 as of $\frac{3}{4}$ of an inch wide extending across the base leg of the U-shaped member 19. The vertically directed slots 21 and 16 are arranged for vertical registration so that when the end piece 19 is mated to the side members 13 for closing off the end of the side members 13, the slots 21 and 16 are in vertical registration and the inwardly directed flange portions 14 and 15 continue around the periphery of the end piece 19 as flanges 23 and 24, respectively. The mated vertically aligned slots 16 and 21 define a pair of side ports of circular cross section extending laterally through the rectangular frame structure 12.

The other end of the rectangular frame structure 12 is closed by means of a generally U-shaped member 25. The inwardly directed leg portions 26 of the end member 25 are horizontally slotted at 27 with slots of, for example, $1\frac{1}{8}$ inch wide and 2 7/16 inch deep. An inwardly directed flange member 28 extends inwardly around the upper lip or edge of the end member 25 and an inwardly directed lower flange portion 29 extends across the base portion of the end member 25.

The horizontal slots 27 and 17 are disposed in horizontal registration one with the other such that when the end member 25 is mated into horizontal registration, the upper and lower flange portions 28 and 29 form a continuous inwardly directed flange around the end and at both the top and bottom of the rectangular frame 12 and the mated horizontal slots 27 and 17 are registered so as to form a pair of circular ports extending laterally through the sides 13 of the rectangular frame 12. In a typical example, the rectangular frame structure 12 has a width of 36 inches, a length of 85 inches, and a depth of 4 inches.

A plate 31 of rigid polyurethane foam insulation, as of 1 inch thick, and covered on opposite sides with aluminum foil 32 and 33 is disposed across the bottom of the frame structure 12. The plate of rigid polyurethane foam serves as a structural element for strength, as a thermal insulator and also as a vapor barrier due to the presence of the aluminum foil.

A solar collector panel 34 is disposed overlaying the foam plate 31. The solar collector panel 34 includes a solar energy absorption plate portion 35, as of 0.016 inch thick aluminum sheet, having a fluid conduit 36 soldered to the backside thereof and arranged in a serpentine path for conducting a fluid therethrough in heat exchanging relation with the solar collecting panel 34. The upper surface of the panel 34 is coated with a flat black paint, such as Nextel black, to a thickness of approximately 0.001 inch. Such a flat black paint is commercially available from 3M Corporation. The flat black paint is painted over two primer coats. The first primer coat is an etch primer having a thickness, as of 0.0002 inch, and the second primer coat is of 0.0005 inch thickness.

The aluminum conduit 36 is soldered to the backside of the aluminum collector plate 35 by means of a thermally conductive soldered such as Alco 807. In a typical example, the conduit 36 has an O.D. of 0.5 inch and a wall thickness of 0.035 inch. A pair of laterally directed manifolds 37 extend across opposite ends of the solar collector panel 34 and are connected in fluid communication with opposite ends of the serpentine fluid conduit 36. In a typical example, the manifolds 37 have an O.D. of 1 inch and a wall thickness of 0.035 inch and are made of 1100-H14 aluminum alloy. Fiberglass mat thermal insulation is wound around the manifold pipes 37 at 38 for thermally insulating the manifolds 37. Also, fiberglass mat insulation is provided at 39 along the inside walls of the rectangular frame structure 12 to provide additional thermal insulation.

A dual sheet glazing structure 41 is disposed overlaying the solar collector panel 34. The glazing structure 41 includes a pair of polycarbonate sheets 42 and 43 joined together by means of a plurality of laterally directed channel or truss members 44, as of polycarbonate extrusion. The outer glazing sheet 42 has a thickness, as of 0.020 to 0.015 inch, and is coated on its outer surface with a UV screen material, such as diebenzophenon dispersed in a methylmethacrylate. The inner glazing sheet 43 has a thickness of 0.0005 inch. A bead of clear polyurethane resin bonds and transverse truss channel members 44 to each of the glazing sheets 42 and 43, respectively. In a typical example, the spacing between the inner and outer glazing sheets 43 and 42 is approximately 0.5 inch.

An aluminum frame structure 45, as of ½ inch by ½ inch aluminum channel, with a thickness as of 1/16 or 3/32 inch and made of 6061 or 6063 aluminum alloy, extends around the periphery in between the glazing sheets 42 and 43. In addition, a cross member 45 of the same channel dimensions extends across the glazing frame midway of its length and inbetween the sheets 42 and 43. As with the polycarbonate truss members 44, the frame 45 is bonded to the inner and outer glazing sheets 43 and 42 by means of a bead of pure polyurethane resin. In addition a bead 46 of clear polyurethane resin provides a weather seal strip between the outer glazing sheet 42 and the outer flange portions 28, 14 and 23 of the panel frame 12, thereby bonding the outer glazing sheet 42 to the flanged frame structure 12 for further increasing its strength and rigidity.

The solar collecting panel structure 11 is assembled in the following manner:

Thermally insulative collars 47, as of ¾ of an inch long and 1.120 inch O.D. and 1.005 inch I.D. with a 0.120 inch wide annular groove provided in the outer wall essentially midway of the length of each collar 47, is slipped over the ends of each of the laterally directed manifold pipes 37. In a typical example the thermally insulative collars 47 are made of CPVC material. With the collar 47 slidably mounted on the laterally directed manifold pipes 37, the collars 47 at the horizontally slotted end of the frame structure 12 are slipped outwardly on the manifold 37 and then the grooves in the collars 47 are slipped horizontally into the horizontal slots 17. Due to the outward displacement of the collars 47, the solar collector panel 34 may pivot downwardly past the inwardly directed flanges 14. The annular recesses in the collars 47, at the vertically slotted end of the frame 12, then slide into the vertical slots 16. Once the solar collector panel 45 is in the horizontal position, the manifold pipe 37 is doped with a suitable ahesive material and the side panels 13 are then slipped toward each other until the vertically slotted end piece 19 can be dropped into position, such that the vertical slots 21 are received within the annular recesses in the thermally insulative collars 47 at the vertically notched end of the frame 12. This locks the vertically slotted end of the frame structure 12 to the solar collector panel 34.

With the horizontally slotted end of the frame structure 12 open, it is stuffed with the thermally insulative plate 31 and the side insulative members 39. Then the glazing plate 41 is stuffed from the open end into the rectangular frame 12. The horizontally slotted end structure 25 is then pushed horizontally into a position so that the inner marginal edges of the horizontal slots 27 are received within the annular grooves in the thermally insulative collars 47, thereby locking the horizontally notched end of the frame 12 to the solar collector panel 34. The weather stripping bead 46 is then placed between the glazing and the outer flange portions 28, 14, and 23, thereby hermetically sealing the panel structure. The end members 19 and 25 are then fixedly secured to the side members 13 by means of a plurality of sheet metal screws passing through the mated side portions of the frame 12.

The advantage of the solar heating panel 11 of the present invention is that it provides an efficient relatively simple, light-weight, strong panel structure which is easily fabricated from relatively low cost components.

What is claimed is:

1. In a solar heating panel:
    solar collector means for disposition to collect solar energy and for converting the collected solar energy into thermal energy;
    fluid conduit means coupled in heat exchanging relation to said solar collector means for removing the collected thermal energy from said solar collector means;

glazing means translucent to solar energy to be collected and for disposition overlaying said solar collector means for thermally insulating said solar collector means from the ambient atmosphere; and frame means for framing said solar collector means and said glazing means, said frame means including a pair of elongated side frame portions and a pair of end portions for closing off opposite ends of said frame means, said side and at least one of said end portions having slots formed therein in registration one with the other such that when said slotted end portion is mated with said slotted side portions said slots are in registration to define a pair of laterally spaced ports in said frame means for passage therethrough of said fluid conduit means.

2. The apparatus of claim 1 wherein said side portions are U-shaped channel members.

3. The apparatus of claim 1 wherein said side portions are slotted at one end with longitudinally directed slots and at the other end with transversely directed slots.

4. The apparatus of claim 1 wherein one of said end portions is slotted with vertically directed slots and said other end portion is slotted with horizontally directed slots.

5. The apparatus of claim 1 wherein said side frame portions include inwardly directed flange portions for capturing said glazing means within said frame means.

6. The apparatus of claim 1 including thermally insulative annularly recessed ring-shape members for disposition within said ports of said frame means and for receiving the marginal edges of said slots within said annular recessed portion of said ring-shaped members.

7. The apparatus of claim 6 wherein said thermally insulative ring-shaped members are for disposition encircling said fluid conduit means where said fluid conduit means passes through said ports in said frame means.

* * * * *